(12) United States Patent
Chen

(10) Patent No.: US 12,317,900 B2
(45) Date of Patent: Jun. 3, 2025

(54) PEARL ARARE STRUCTURE AND MANUFACTURING METHOD THEREOF

(71) Applicant: SAN SHU GONG FOOD CO., LTD., New Taipei (TW)

(72) Inventor: Mei-Yao Chen, New Taipei (TW)

(73) Assignee: SAN SHU GONG FOOD CO., LTD., New Taipei (TW)

( * ) Notice: Subject to any disclaimer, the term of this patent is extended or adjusted under 35 U.S.C. 154(b) by 471 days.

(21) Appl. No.: 17/898,442

(22) Filed: Aug. 29, 2022

(65) Prior Publication Data

US 2024/0065278 A1    Feb. 29, 2024

(51) Int. Cl.
*A21D 13/30*    (2017.01)
*A21D 13/32*    (2017.01)
*A23P 10/25*    (2016.01)

(52) U.S. Cl.
CPC ............. *A21D 13/32* (2017.01); *A23P 10/25* (2016.08)

(58) Field of Classification Search
CPC ................................ A21D 13/30; A21D 13/32
See application file for complete search history.

(56) References Cited

FOREIGN PATENT DOCUMENTS

| CN | 2515960 Y | * | 10/2002 | ............... A23G 1/00 |
| EP | 1733626 A1 | * | 12/2006 | ............. A21D 13/32 |

OTHER PUBLICATIONS

Machine translation of CN2515960. Publication date Oct. 16, 2002. pp. 1-2. (Year: 2002).*
Mickey-shaped milk tea boba biscuits. Available online as of Jul. 28, 2020 from https://www.directiveadventure.com. pp. 1-18. (Year: 2020).*

* cited by examiner

*Primary Examiner* — Jenna A Watts
(74) *Attorney, Agent, or Firm* — Leong C. Lei

(57) ABSTRACT

A pearl arare structure includes a biscuit body that is in a three-dimensional form having a predetermined thickness and a mixture that is mixed in the biscuit body. The mixture includes a cotton-like sweety filling and a plurality of pearls, so that the pearl arare, when being consumed, exhibits a new mouthfeel of both arare and pearls to thereby enhance the product value of the arare. A manufacturing method of the pearl arare includes steps of subjecting a pearl raw material to stirring, steaming, and sugar adding so as to be shaped into pearls; steps of subjecting a cotton candy raw material to cooking, and whisking and stirring to form a cotton-like sweety filling; a step of mincing biscuit into biscuit flakes; and steps of subjecting a predetermined amount of the pearls, the cotton-like sweety filling, and the biscuit flakes to mixing, cooling, rolling, and then cutting.

9 Claims, 6 Drawing Sheets

PEARL ARARE STRUCTURE AND MANUFACTURING METHOD THEREOF

TECHNICAL FIELD OF THE INVENTION

The present invention relates generally to a pearl arare structure and a manufacturing method thereof, and more particularly to a pearl arare structure, and a manufacturing thereof, which presents a new mouthfeel of both arare and pearls to thereby make the mouthfeel of arare unique and thus enhance the product value of arare.

DESCRIPTION OF THE PRIOR ART

Arare is a dessert that has been recently popularized, because the arare is a kind of dessert that exhibits a sweety taste and is moderately sticky to teeth. Known arare is generally made by using butter, milk powder, cotton candy, or biscuit as a main body, so that the mouthfeel of the arare is just like a combination of nougat and sachima, and one can taste the stickiness of melted cotton candy and the aroma of crackers. To enhance the mouthfeel, some types of arare are added with cocoa, matcha powder, or sesame, or even cheese, as a challenge for arare of different flavors. This brings minor changes to the arare.

Recently, pearls (tapioca balls) are popular in Taiwan as a unique food and are commonly used in making of pearl milk tea drinks, or pearl based ice products or frozen desserts, which are popular both locally and globally, because such products or desserts presents not only the aromatic and sweety flavor of tea products or ice desserts, but also the soft-chewy mouthfeel of the pearls. Such a combined flavor or taste has been only found in the pearl milk tea drinks and similar frozen desserts and has been regrettably not included in other food products. The present invention aims to provide a pearl arare structure, and also a manufacturing method thereof, which makes an arare exhibiting a combined flavor to present a new mouthfeel of both arare and pearls.

SUMMARY OF THE INVENTION

The primary objective of the present invention is to provide a pearl arare structure and a manufacturing method thereof, in which pearls are used in combination with a biscuit and a cotton-like sweety filling to make arear exhibiting a combined mouthfeel and thus presenting, when being eaten, a unique taste of both arare and pearls to thereby enhance the product value of the arare.

The pearl arare structure, and a manufacturing method thereof, mainly comprises a biscuit body that is in a three-dimensional form having a predetermined thickness and a mixture that is mixed in the biscuit body, the mixture comprising a cotton-like sweety filling and a plurality of pearls, so that the pearl arare, when being eaten, exhibits a new mouthfeel of both arare and pearls to thereby enhance the product value of the arare.

The method for manufacturing the pearl arare comprises steps of subjecting a pearl raw material to stirring, steaming, and sugar adding so as to be shaped into pearls; steps of subjecting a cotton candy raw material to cooking, and whisking and stirring to form a cotton-like sweety filling; a step of mincing biscuit into biscuit flakes; and steps of subjecting a predetermined amount of the pearls, the cotton-like sweety filling, and the biscuit flakes to mixing, cooling, rolling, and then cutting.

In the above-described method for manufacturing the pearl arare, the pearl raw material comprises: 3.847% water; 3.225% hydroxypropyl distarch phosphate; 0.138% prepared mix powder; 0.065% brown sugar flavoring; 0.009% caramel coloring; 0.009% fatty acid glyceride, and 0.009% potassium sorbate.

In the above-described method for manufacturing the pearl arare, the cotton candy raw material comprises: 1.841% glucose; 3.774% water; 27.64% malt sugar; and 0.778% gelatin.

In the above-described method for manufacturing the pearl arare, the cotton candy raw material is cooked at a temperature around 110° C. for a time period of approximately 20 minutes.

In the above-described method for manufacturing the pearl arare, the cotton candy raw material, after being cooked, is added with 4.142% clarified butter; 3.682% milk powder; and 0.552% flavoring and is whisked and stirred to form the cotton-like sweety filling.

DETAILED DESCRIPTION OF THE PREFERRED EMBODIMENT

Figure 1:
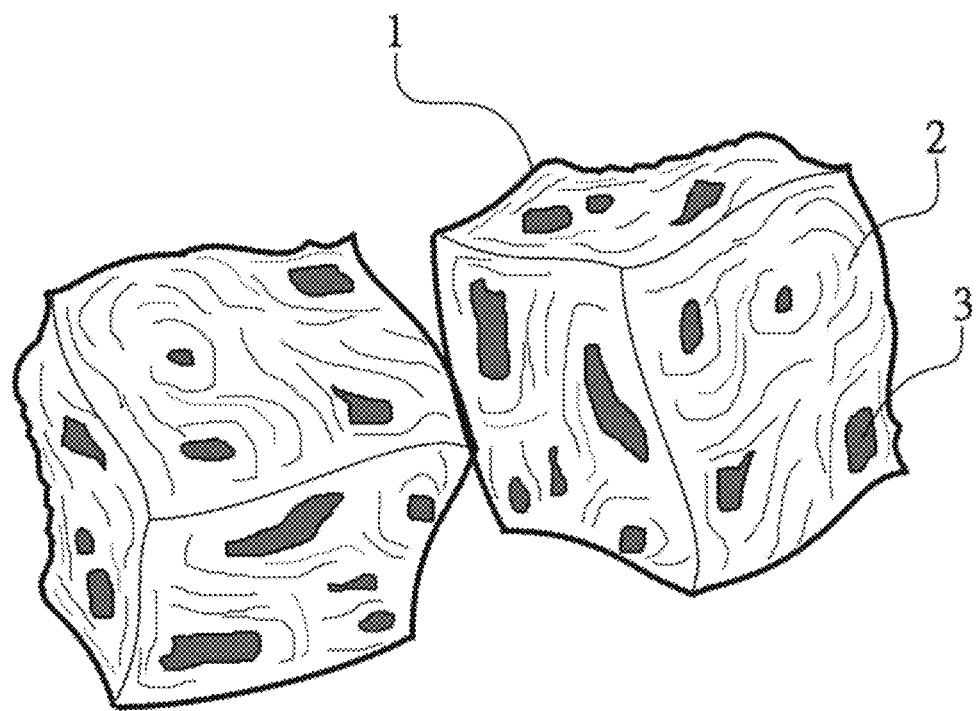
FIG. 1 is a perspective view showing pearl arare according to the present invention.

Referring to FIG. 1, a perspective view of pearl arare according to the present invention is shown. As shown in the drawing, the pearl arare according to the present invention comprises a three-dimensional biscuit body 1 having a thickness and a mixture that is mixed in the biscuit. The mixture comprises a cotton-like sweety filling 2 and a plurality of pearls 3, so that the pearl arare, when being eaten, exhibits a new mouthfeel including both arare and pearls to thereby enhance the product value of the arare.

Figure 2:
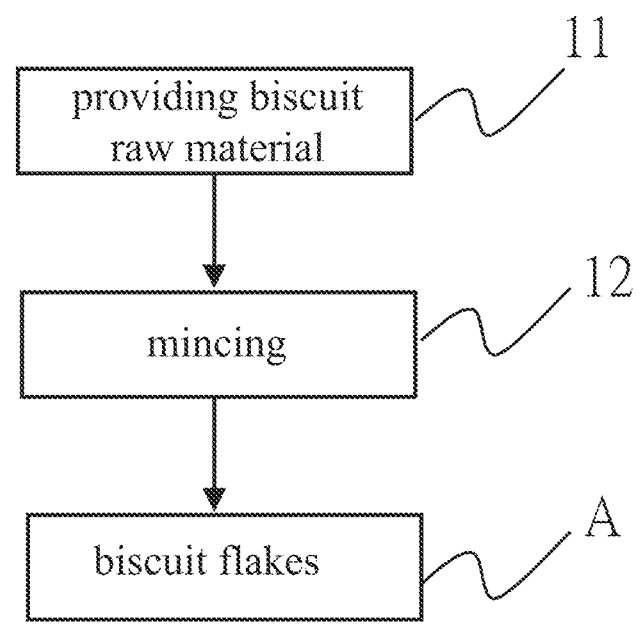
FIG. 2 is a flow chart showing a process for manufacturing a biscuit body according to the present invention.

Referring to FIG. 2, a flow chart showing a process for manufacturing the biscuit body 1 according to the present invention is provided. As shown in the drawing, the process for manufacturing the biscuit body 1 according to the present invention comprises the following steps:

(1) providing biscuit raw material 11, wherein the biscuit raw material comprises 34.552% of biscuit (which, in the instant embodiment, is "Cheerful Cracker").

(2) mincing 12, wherein the biscuit of Step 1 is minced to form biscuit flakes A.

Figure 3:
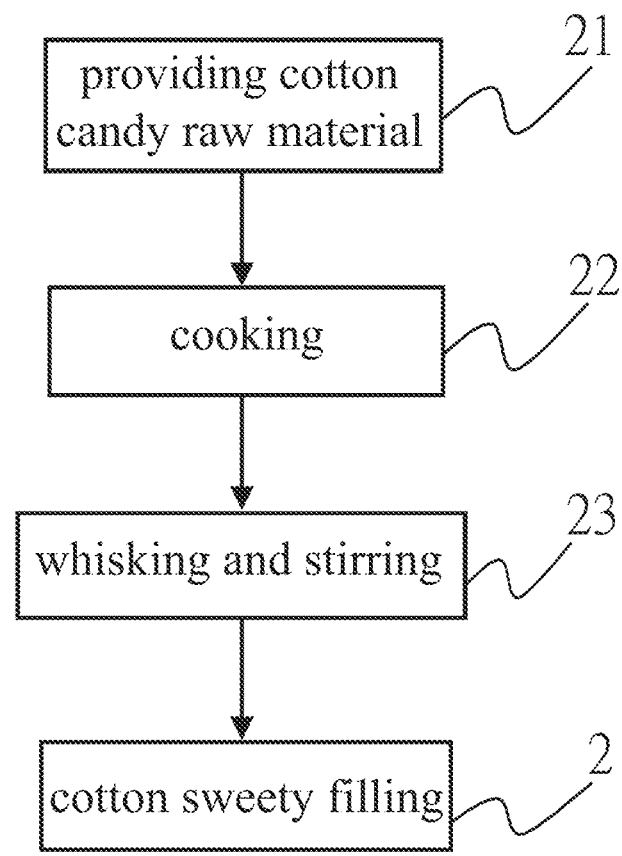
FIG. 3 is a flow chart showing a process for manufacturing a cotton-like sweety filling according to the present invention.

Referring to FIG. 3, a flow chart showing a process for manufacturing the cotton-like sweety filling 2 according to the present invention is provided. As shown in the drawing, the process for manufacturing the cotton-like sweety filling 2 according to the present invention comprises the following steps:

(1) providing cotton candy raw material 21, wherein the cotton candy raw material comprises: 1.841% glucose; 3.774% water; 27.64% malt sugar; and 0.778% gelatin.

(2) cooking 22, wherein the cotton candy raw material of Step 1 is cooked at around 110° C. for approximately 20 minutes.

(3) whisking and stirring 23, wherein the cooked cotton candy raw material is added with 4.142% clarified butter; 3.682% milk powder; and 0.552% flavoring and whisked and stirred to form the cotton-like sweety filling 2.

Figure 4:
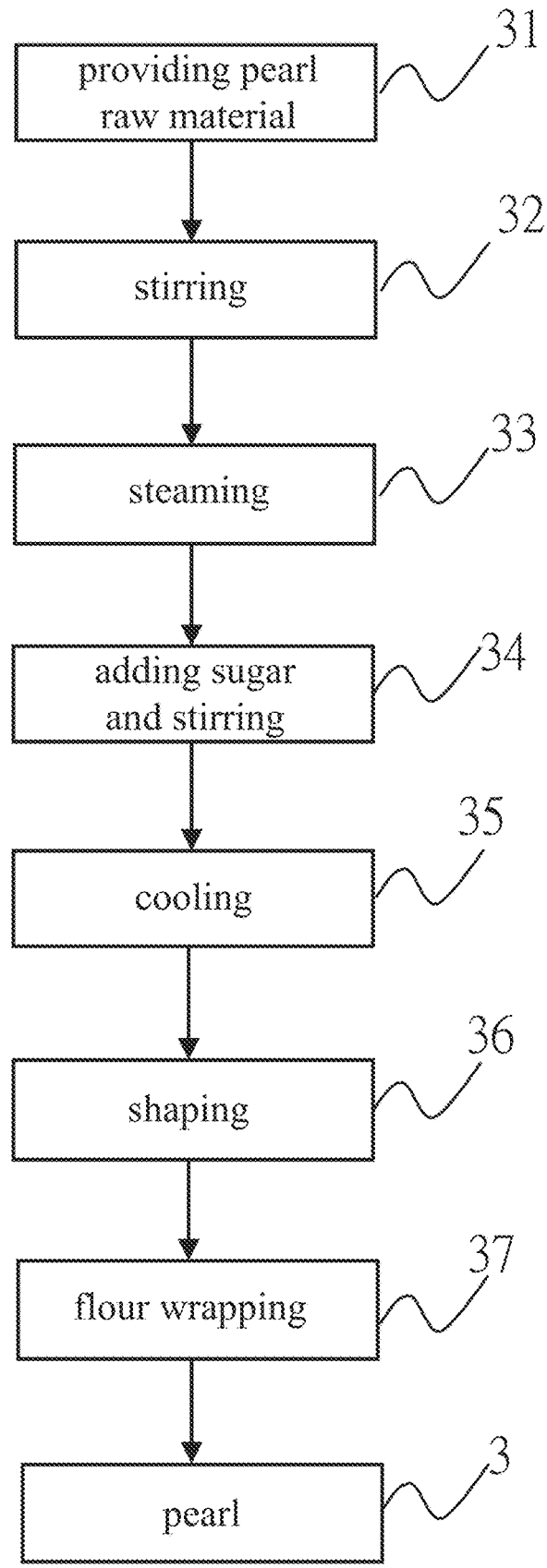
FIG. 4 is a flow chart showing a process for manufacturing pearls according to the present invention.

Referring to FIG. 4, a flow chart showing a process for manufacturing pearls according to the present invention is provided. As shown in the drawing, the process for manufacturing the pearls 3 according to the present invention comprises the following steps:

(1) providing pearl raw material 31, wherein the pearl raw material comprises: 3.847% water; 3.225% hydroxypropyl distarch phosphate; 0.138% prepared mix powder; 0.065% brown sugar flavoring; 0.009% caramel coloring; 0.009% fatty acid glyceride, and 0.009% potassium sorbate.

(2) stirring 32, wherein a predetermined amount of the pearl raw material of Step 1 is mixed and stirred.

(3) steaming 33, wherein the mixed and stirred pearl raw material of Step 2 is steamed at a temperature of around 100° C. for approximately 20 minutes.

(4) adding sugar and stirring 34, wherein the steamed pearl raw material of Step 3 is added with 12.279% malt sugar and 3.225% granulated sugar and is uniformly stirred.

(5) cooling 35, wherein a sugar-added and stirred semifinished product of Step 4 is placed in room temperature for cooling.

(6) shaping 36, wherein the cooled semifinished product is diced and shaped into a pellet form.

(7) flour wrapping 37, wherein the diced and shaped semifinished product is wrapped with 0.12% potato flour to form pearls 3.

Figure 5:
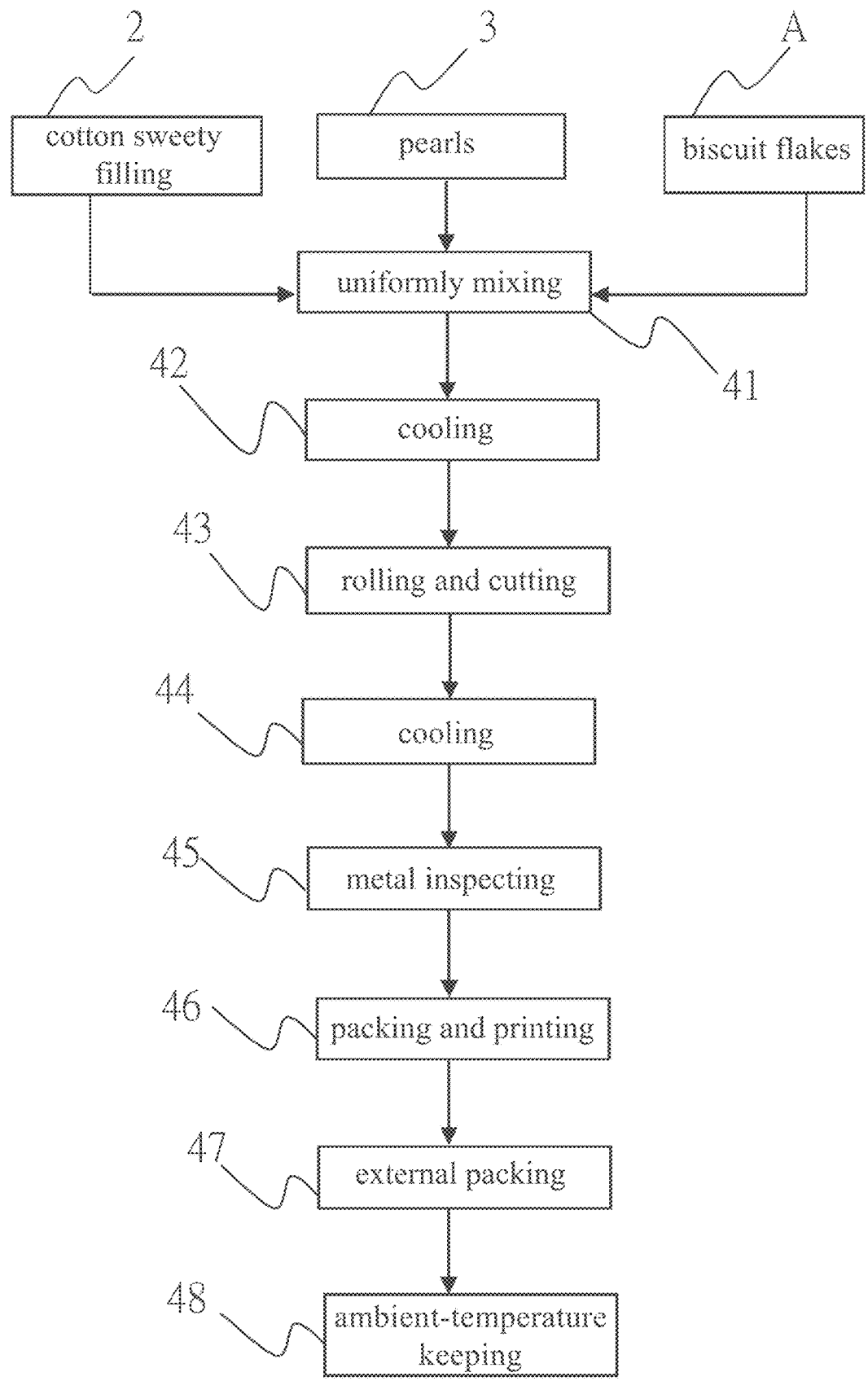
FIG. 5 is a flow chart showing a process for manufacturing pearl arare according to the present invention.

Referring to FIG. 5, a flow chart showing a process for manufacturing pearl arare according to the present invention is provided. As shown in the drawing, the process for manufacturing pearl arare according to the present invention comprises the following steps:

(1) uniformly mixing 41, wherein the biscuit flakes A, the cotton-like sweety filling 2, and the pearls 3 are uniformly mixed to form a pearl arare semifinished product.

(2) cooling 42, wherein the pearl arare semifinished product of Step 1 is placed in room temperature for cooling.

(3) rolling and cutting 43, wherein the cooled pearl arare semifinished product of Step 2 is rolled with a predetermined pressure for compacting and is then cut into blocks of a predetermined size so as to form a pearl arare product.

(4) cooling 44, wherein the cut blocks of pearl arare of Step 3 is placed in room temperature for cooling.

(5) metal inspecting 45, wherein equipment is applied to inspect whether or not the pearl arare product finished in Step 1 contains a metallic ingredient.

(3) packing and printing 46, wherein the pearl arare of Step 5 is packed, and product illustration and marking are printed (6) external packing 47, wherein a predetermined quantity of the pearl arare are collected and packed.

(7) ambient-temperature keeping 48, wherein the packing-completed pearl arare is kept in an ambient temperature for being ready to shipping.

Figure 6:
FIG. 6 is a picture showing a physical form of arare according to the present invention.

Referring to FIG. 6, a drawing showing a physical form of the arare according to the present invention is provided. As shown in the drawing, the arare product manufactured according to the present invention includes a biscuit body that is in a three-dimensional form having a predetermined thickness, and a cotton-like sweety filling and a plurality of pearls mixed in the biscuit body, so that the pearl arare, when being eaten, exhibits a new mouthfeel of both arare and pearls.

In summary, the present invention provides pearl arare that includes a biscuit body in a three-dimensional form having a predetermined thickness, and a cotton-like sweety filling and a plurality of pearls mixed in the biscuit body, so that the pearl arare, when being eaten, exhibits a new mouthfeel of both arare and pearls to thereby enhance the product value of the arare, this being a practical design and innovated creation.

I claim:

1. A pearl arare manufacturing method, comprising the following steps:
    providing a predetermined amount of pearl raw material, which is mixed and stirred, and is steamed;
    adding sugar to the steamed pearl raw material and uniformly stirring, and then placing a sugar-added and stirred semifinished product in room temperature for cooling;
    dicing and shaping the cooled semifinished product to form pearls in a pellet form and wrapping with flour;
    providing a predetermined amount of biscuit raw material, which is minced to form biscuit flakes;
    providing a predetermined amount of cotton candy raw material, which is cooked, and whisked and stirred to form a cotton-like sweety filling;
    uniformly mixing the pearls, the biscuit flakes, and the cotton-like sweety filling to form a pearl arare semifinished product; and
    subjecting the pearl arare semifinished product to cooling, and rolling and cutting, to shape into pearl arare.

2. The pearl arare manufacturing method according to claim 1, wherein the pearl raw material comprises: 3.847% water; 3.225% hydroxypropyl distarch phosphate; 0.138% prepared mix powder; 0.065% brown sugar flavoring; 0.009% caramel coloring; 0.009% fatty acid glyceride, and 0.009% potassium sorbate.

3. The pearl arare manufacturing method according to claim 1, wherein the steamed pearl raw material is added with 12.279% malt sugar and 3.225% granulated sugar, and is uniformly stirred.

4. The pearl arare manufacturing method according to claim 1, wherein the shaped pearls are wrapped with 0.23% potato flour.

5. The pearl arare manufacturing method according to claim 1, wherein the pearl raw material is steamed at a temperature around 100° C. for a time period of approximately 20 minutes.

6. The pearl arare manufacturing method according to claim 1, wherein the biscuit flakes are formed by mincing biscuit of 34.552%.

7. The pearl arare manufacturing method according to claim 1, wherein the cotton candy raw material comprises: 1.841% glucose; 3.774% water; 27.64% malt sugar; and 0.778% gelatin.

8. The pearl arare manufacturing method according to claim 1, wherein the cotton candy raw material is cooked at a temperature of around 110° C. for a time period of approximately 20 minutes.

9. The pearl arare manufacturing method according to claim 1, wherein the cotton candy raw material, after being cooked, is added with 4.142% clarified butter; 3.682% milk powder; and 0.552% flavoring and is whisked and stirred to form the cotton-like sweety filling.

\* \* \* \* \*